(12) United States Patent
Manbeck et al.

(10) Patent No.: US 6,624,844 B1
(45) Date of Patent: Sep. 23, 2003

(54) VIDEO FIELD LABELING

(75) Inventors: Kevin Manbeck, Cranston, RI (US); Chengda Yang, Auburndale, MA (US); Donald Geman, Amherst, MA (US); Stuart Geman, Providence, RI (US)

(73) Assignee: MTI Film LLC, Providence, RI (US)

( * ) Notice: Subject to any disclaimer, the term of this patent is extended or adjusted under 35 U.S.C. 154(b) by 512 days.

(21) Appl. No.: 09/643,309

(22) Filed: Aug. 21, 2000

Related U.S. Application Data (60) Provisional application No. 60/150,020, filed on Aug. 20, 1999.

(51) Int. Cl.$^7$ ............................................. H04N 7/18
(52) U.S. Cl. ..................... 348/97; 375/240.25; 348/459
(58) Field of Search ................. 348/699–702, 348/94–100, 450–460; 375/240.25, 240.29; 345/328, 441, 445, 448, 458

(56) References Cited

U.S. PATENT DOCUMENTS

| | | | | |
|---|---|---|---|---|
| 5,260,787 A | | 11/1993 | Capitant et al. ............. | 358/140 |
| 5,606,655 A | * | 2/1997 | Arman et al. ................ | 345/440 |
| 5,734,420 A | | 3/1998 | Lee et al. ..................... | 348/97 |
| 5,828,786 A | | 10/1998 | Rao et al. .................... | 382/236 |
| 6,278,446 B1 | * | 8/2001 | Liou et al. ................... | 345/700 |
| 6,282,317 B1 | * | 8/2001 | Luo et al. .................... | 382/203 |
| 6,542,199 B1 | * | 1/2003 | Manbeck et al. ............ | 348/459 |

FOREIGN PATENT DOCUMENTS

| | | | | |
|---|---|---|---|---|
| EP | 0 428 073 A2 | 11/1990 | ............ | H04N/7/01 |
| EP | 0 612 187 A2 | 2/1994 | ............ | H04N/7/01 |
| EP | 0 730 378 A2 | 2/1996 | ............ | H04N/7/01 |

OTHER PUBLICATIONS

Sigelle M., et al. "Modéles de Potts et Relaxation D'Images de Labels Par Champs de Markov," Traitement du Signal, Fr., Centrale Des Revues, Montrouge, vol. 9, No. 6, 1992, (In French with English Translation) pp. 449–458.
EPO International Search Report, PCT/US00/40700, Feb. 9, 2001.

* cited by examiner

*Primary Examiner*—Andy Rao
(74) *Attorney, Agent, or Firm*—Bromberg & Sunstein LLP

(57) ABSTRACT

A method for determining labels for video fields by identifying the state of the field is disclosed. Some examples of a video field's state include the origin of the field as film or video, its relative location with respect to edit points, and in the case of film-originating material, the location within the standard sequential pattern which results from converting film to video. To determine the label of a video field, the conditional probability distribution for a particular sequence of states given the entire video sequence is calculated. This may be optimized by using dynamic programing to maximize the conditional probability function and thus the labels. To determine the conditional probability, first the joint probability distribution is determined for the observed video fields and the states. This joint probability is calculated by creating a data model and a structure model for the video sequence. From the joint probability distribution an equation representing the conditional probability of having a particular sequence of states given a particular video field is determined. By maximizing this distribution over all states, which may be performed through dynamic programming the most likely state is determined which is consistent with the given video sequence data. Once the states are determined, labels corresponding to the states may be inserted within the video sequence.

43 Claims, 8 Drawing Sheets

FILM
FIG. 1A

VIDEO
FIG. 1B

4 FRAMES YIELD 8 FIELDS

24 FRAMES/sec

FILM FORMAT
FIG. 2A

4 FRAMES (8 FIELDS) BECOMES 10 FIELDS

30 FRAMES/sec

AFTER 3:2 PULLDOWN
FIG. 2B

FIG. 3

FIELD LABELS FOR
VIDEO ORIGINATING MATERIAL

| | | |
|---|---|---|
| ODD FIELD | | V |
| EVEN FIELD | | v |
| ODD FIELD | FIRST FIELD AFTER CUT | V' |
| EVEN FIELD | FIRST FIELD AFTER CUT | v' |
| ODD FIELD | SECOND FIELD AFTER CUT | V" |
| EVEN FIELD | SECOND FIELD AFTER CUT | v" |

FIG. 4

FIELD LABELS FOR FILM ORIGINATING MATERIAL

| FIELD | FIRST FIELD AFTER A CUT | SECOND FIELD AFTER A CUT |
|---|---|---|
| A | A' | A" |
| a | a' | a" |
| $B_1$ | $B_1'$ | $B_1"$ |
| b | b' | b" |
| $B_2$ | $B_2'$ | $B_2"$ |
| c | c' | c" |
| C | C' | C" |
| $d_1$ | $d_1'$ | $d_1"$ |
| D | D' | D" |
| $d_2$ | $d_2'$ | $d_2"$ |

VIDEO FIELD LABELING

This application claims priority from U.S. provisional patent application Ser. No. 60/150,020 entitled Video Field Labeling filed on Aug. 20, 1999 which is incorporated herein, in its entirety, by reference.

TECHNICAL FIELD

The disclosed invention is for use with film and more specifically with the processing of edited digital video.

BACKGROUND ART

Figure 1A:
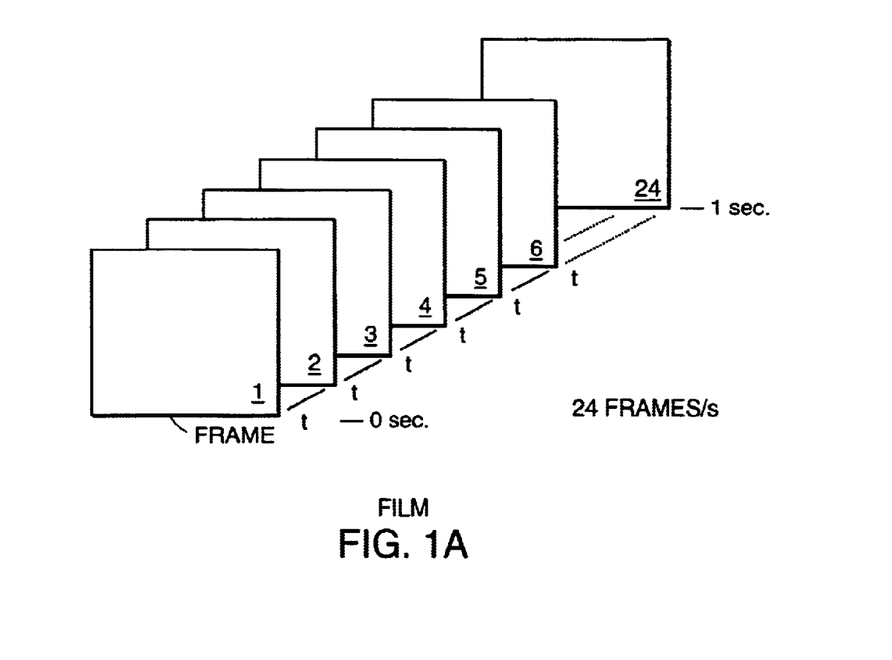
FIG. 1A shows film composed of multiple frames.
Figure 1B:
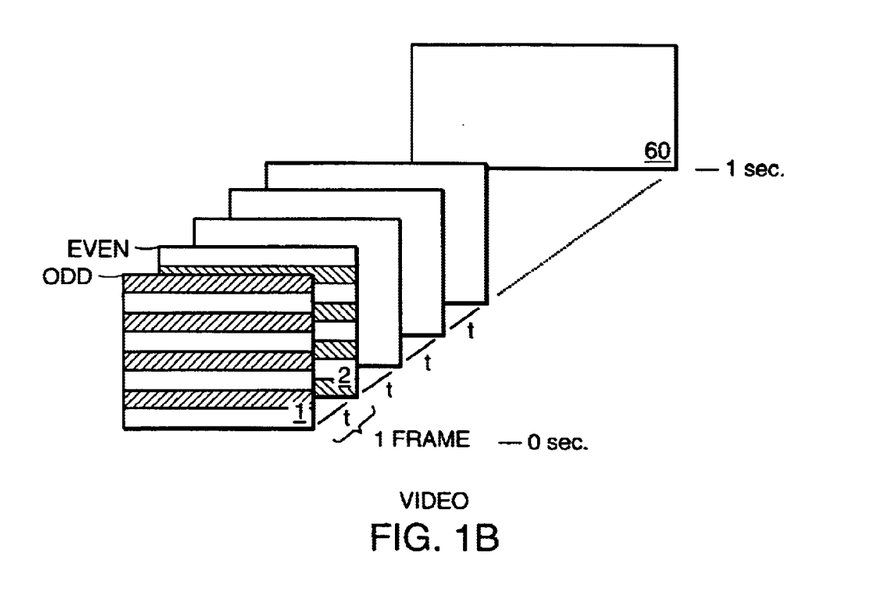
FIG. 1B shows video composed of multiple fields.

Digital film is composed of multiple frames of digital data each corresponding to an image captured at a different point in time as shown in FIG. 1A. Currently, film is shot and displayed at 24 frames per second. In contrast, video is displayed at the rate of 60 "fields" per second as shown in FIG. 1B. A field consists of one-half the number of lines forming a complete image. In video, the odd and even lines of a complete image are displayed in successive fields. This process is known in the art as "interlacing."

Figure 2A:
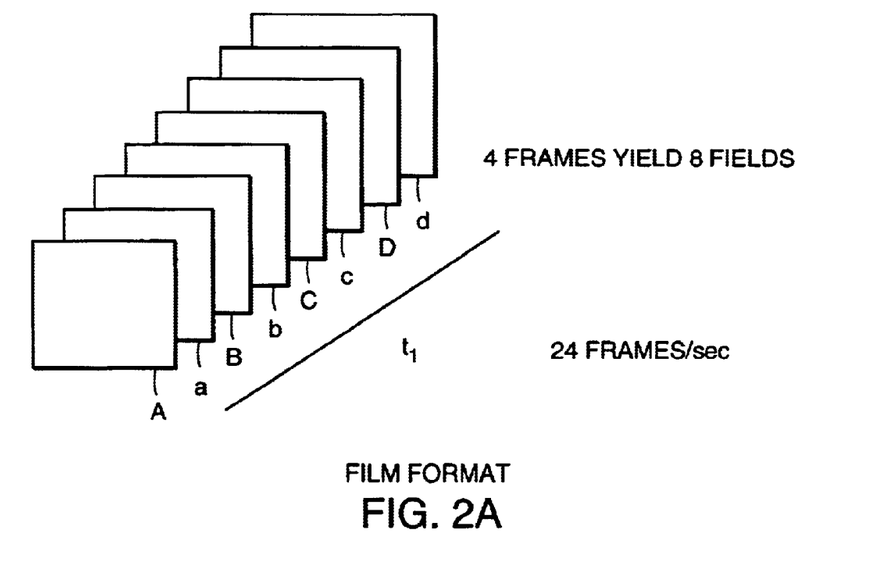
FIG. 2A shows film which is digitized and composed of fields.
Figure 2B:
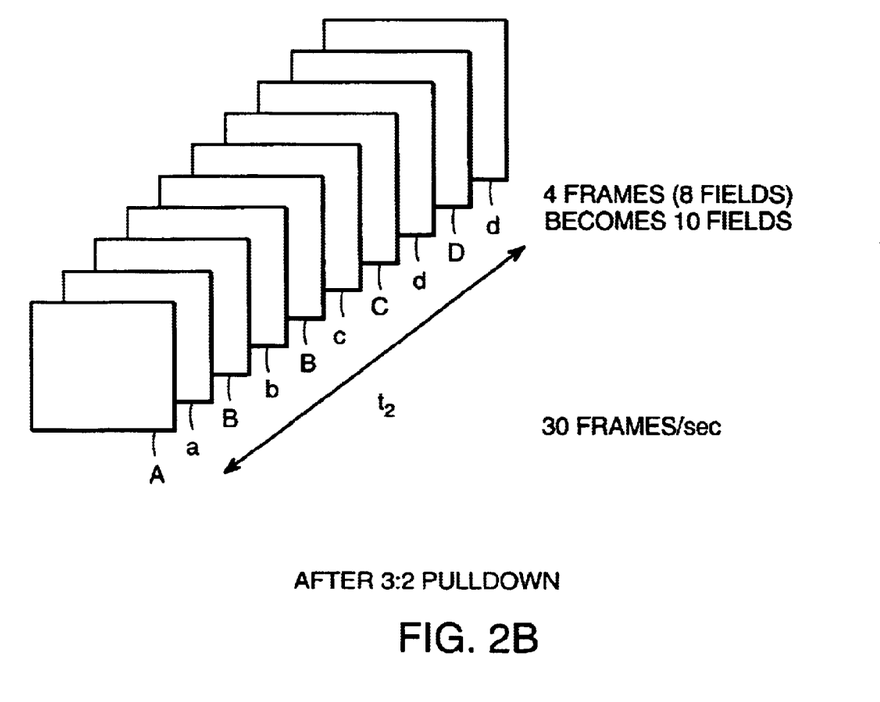
FIG. 2B shows film in the form of FIG. 2A which has undergone 3:2 pulldown.

In order to show digital film in a digital video environment the digital film data must undergo a conversion process known as "3:2 pulldown." 3:2 pulldown creates ten fields of video from four frames of film. Let A, B, C, D represent four consecutive film frames and AaBbCcDd represents the four frames represented as 8 interlaced fields as shown in FIG. 2A. The ten corresponding video fields are then A,a,B,b,B,c,C,d,D,d where A, B, C, D represent, respectively, the odd lines of A, B, C, D and a, b, c, d represent, respectively, the even lines of A, B, C, D as shown in FIG. 2B. The odd lines of frame B and the even lines of frame D are used twice.

If no further processing of the resulting video stream occurs (such as cutting and splicing, introducing fades, etc.) then a simple enumeration of the video fields is sufficient to determine the particular film frame from which that field is extracted. However, in the video industry, digital film sequences and digital video sequences are often edited together. After editing in which both video originating and film originating material are combined, it is often desirable to return the edited video sequence back to a film format. Preserving the temporal length of an edited video sequence has presented a difficult process for those in the art, due to the inability to tell the originating frame for a given field in the edited video sequence.

SUMMARY OF THE INVENTION

Digital video, whatever its origin, is usually heavily processed, due especially to standard editing and the introduction of special effects. The disclosed method determines labels for video fields by identifying the state of the field. Some examples of a video field's state include the origin of the field as film or video, its relative location with respect to edit points, and in the case of film-originating material, the location within the standard sequential pattern which results from converting film to video.

To determine the label of a video field, the conditional probability distribution for a particular sequence of states given the entire video sequence is calculated. This may be optimized by using dynamic programing to maximize the conditional probability function and thus the labels. To determine the conditional probability, first the joint probability distribution is determined for the observed video fields and the states. This joint probability is calculated by creating a data model and a structure model for the video sequence.

A data model is the conditional probability of observing a video field sequence given a sequence of states. The data model is determined by comparing fields and determining interfield differences and normalizing the result. The structure model is the probability for each sequence of states and is determined based upon statistics regarding video field transitions from past video sequences. By combining the data model and the structure model the joint probability distribution is calculated.

From the joint probability distribution an equation representing the conditional probability of having a particular sequence of states given a particular video field is determined. By maximizing this distribution over all states, which may be performed through dynamic programming the most likely state is determined which is consistent with the given video sequence data. Once the states are determined, labels corresponding to the states may be inserted within the video sequence.

When implemented in a computer program or computer program product, the computer code comprises code for receiving historic video field information regarding transitions. The computer code, uses the digital video field data from the edited video sequence and calculates the conditional densities for all possible sequences and then uses dynamic programming to calculate the labels based on the historic video field information and the conditional densities.

The information provided by the labels is necessary for a variety of applications, including compression and reformatting. The resulting annotated video stream can then be efficiently compressed, reformatted (e.g., into whole film frames) or otherwise processed in a manner similar to unprocessed video. The state of a video field may also be used in conjunction with "cadence editing" to reorder the video sequence to obtain the proper temporal cadence which is disclosed in U.S. patent application (Number not yet available) filed on Aug. 21, 2000 entitled "Cadence Editing" claiming priority from provisional application entitled "Cadence Editing" filed on Aug. 20, 1999 having Ser. No. 60/150,016 which is owned by the same assignee and is incorporated by reference herein in its entirety.

BRIEF DESCRIPTION OF THE DRAWINGS

The invention will be more readily understood by reference to the following detailed description of specific embodiments taken with reference to the accompanying drawings in which.

DETAILED DESCRIPTION OF SPECIFIC EMBODIMENTS

In the detailed description and the appended claims let F denote a sequence of video fields and let $X=(X_1, X_2, ---, X_N)$ denote a desired sequence of labels. Each video field $F_n$ is assumed to have three intensity arrays $(F_n^{(1)}, F_n^{(2)}, F_n^{(3)})$. The physical interpretation of the intensity value $F_n^{(I)}$ for I=1, 2, 3 is determined based on the color coordinate system. Common examples are red, green and blue, or one luminance and two chrominance values. Although the disclosure uses three intensity arrays to represent a video field it should be understood by one of ordinary skill in the art that there are other representations of a video field that may also be used. In the following description and appended claims, the terms "state" and "label" shall be used interchangeably, as each field has a state which may be represented by a label.

Figure 3:
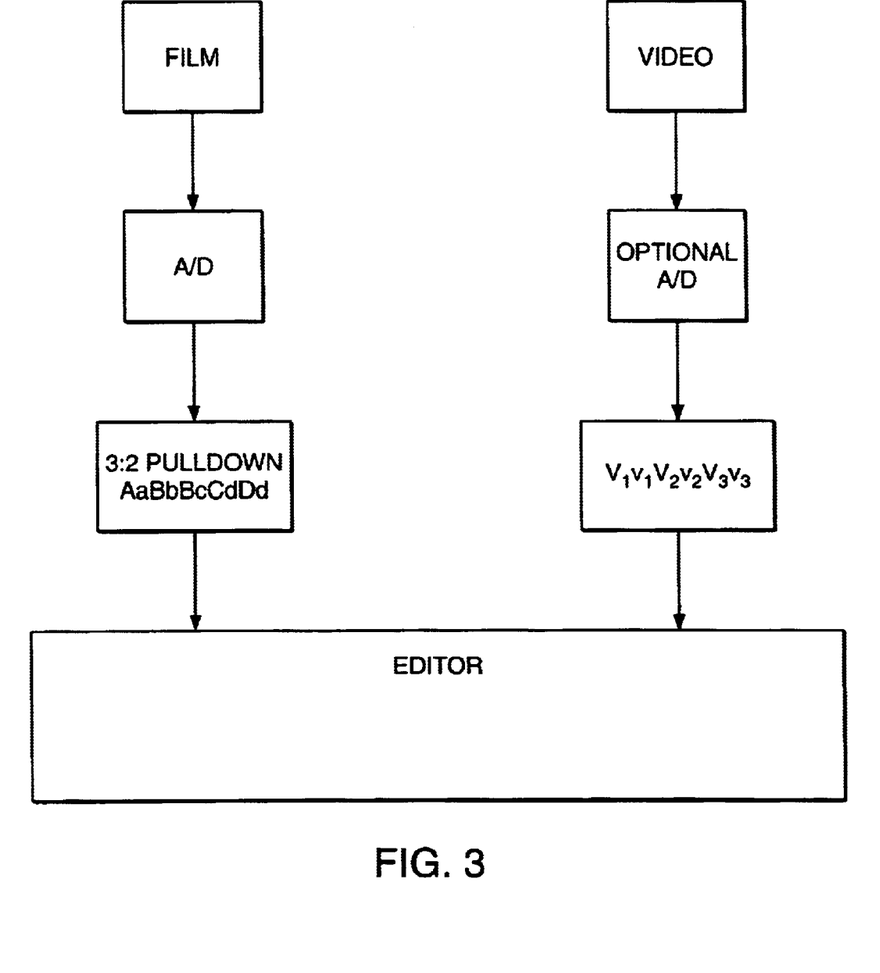
FIG. 3 shows both a film originating sequence and a video originating sequence being input into an editor.

FIG. 3 shows both a film-originating sequence and a video-originating sequence being input into an editor which results in an edited video sequence which contains a mixture of film-originating and video-originating material. The film originating sequence is converted to a digital sequence through the use of an analog to digital converter. The film source is then transformed so that it may be displayed at the rate of 30 frames per second which is equivalent to 60 fields per second. This transformation is known as "3:2 pulldown" and establishes a correspondence between each consecutive set of four film frames and ten video fields. The video sequence takes the form of $AaB_1bB_2cCd_1Dd_2$. This correspondence is necessary for efficient MPEG compression, conversion from video to film format (e.g, to show a TV commercial in a movie theater), and other numerical procedures, many of which are driven by recent developments in high definition broadcasting and the expanded role of digital video disks (DVD). After 3:2 pulldown the video sequence is placed into the video editor.

The video originating sequence is either originally in analog or digital form. If it is in digital form, it is passed directly to the editor, if it is in analog form it undergoes a conversion to digital in an analog to digital converter so that the video sequence is interlaced and takes the form of $V_1v_1V_2v_2\ldots V_nv_n$. Prior to editing, both the film originating material and video originating material exhibit perfect cadence. Perfect cadence which is lost during editing allows the originating frame to be determined based upon the location of the field in the edited video sequence. It should be understood by those of ordinary skill in the art that other types of data may be input into the editor, for example, computer originating material such as special effects.

Figure 4:
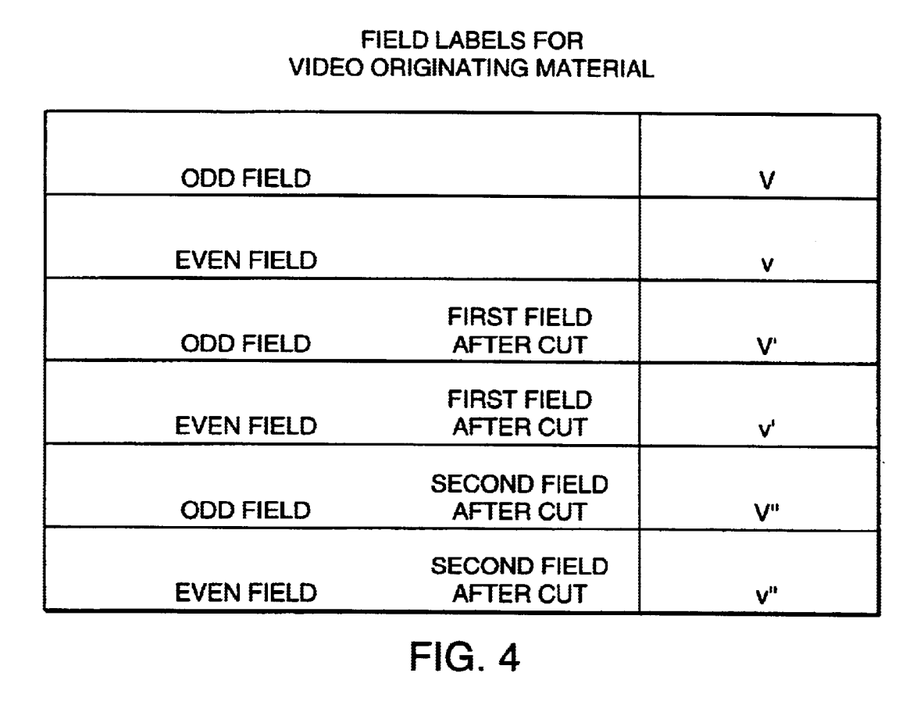
FIG. 4 shows a table of the possible states for a video originating field.

Once editing has occurred, the method determines labels for each field which indicates the origin of the fields $F_1, \ldots, F_N$ (film-originating or video-originating), and the field's location relative to edit points and the position within the cycle AaBbBcCdDd in the case of film-originating material. In the preferred embodiment, each $X_n$, (label), assumes one of 36 possible "states." FIG. 4 shows a table showing the first six states for video originating material in this implementation. The state is $X_n=V$ if the field is odd and video originating or $X_n=v$ if the field is even and video-originating. Each field that immediately follows an edit is designated with a prime so that $X_n=V'$ or $X_n=v'$. Additionally, the second field after a cut is designated with a double prime so that $X_n=V''$ or $X_n=v''$ depending on whether the field is an odd or an even field.

Figure 5:
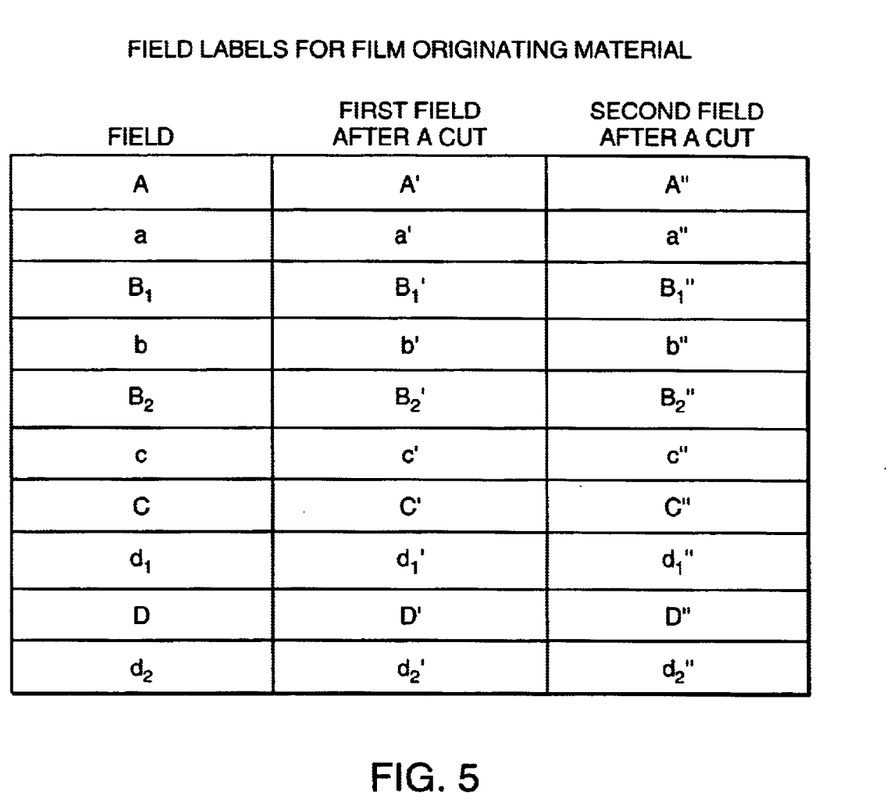
FIG. 5 shows a table of the possible states for a film originating field.

The remaining 30 states of the 36 possible states of the preferred embodiment refer to film-originating material as shown in FIG. 5. The 10 basic states are A, a, $B_1$, b, $B_2$, c, C, $d_1$, D, $d_2$ indicating relative position within the 10 video fields which result from the 3:2 pull down process applied to the four consecutive film frames. Ten more states, denoted with a prime (A', a', B', $B_1$, b', $B'_2$, c', C', $d'_1$, D', $d'_2$) signify the field is right after a cut; the final ten contain a double prime, (A'', a'', B''$_1$, b'', B''$_2$, c'', C'', d''$_1$, D'', d''$_2$) and indicate that the field is the second field after a cut. It should be understood by those of ordinary skill in the art that other state spaces may be used having more or less states than the enumerated 36 states above. For example computer generated effects may be given their own designation and associated states.

As expressed above, editing, such as cutting, splicing, and introducing special effects, such as fades, disrupts perfect cadence. Perfect cadence refers to a repeated pattern of the form AaBbBcCdDd in successive cycles of size ten in a video sequence. In this redundancy pattern, each of the four pairs (A, a), (B, b), (C, c), (D, d) corresponds to the same instant in time for both the video sequence AaBbBcCdDd and the interlaced version of the film sequence (A, a), (B, b), (C, c), (D, d).

For example, in an edited video sequence the actual cadence might be $$X=(A,a,B_1,b,B_2,c,B'_2,c'',C,d_1,D,d_2,V',v'',V,v,\ldots)$$

In most edited video sequences, the redundant fields are not where they are expected to be immediately after 3:2 pull down. In the above example three pieces of video have been joined, one of the form A, a, $B_1$, b, $B_2$, c, the second is of the form $B_2$, c, ... And the third V', v'', V, v. Let "1" indicate a field which is "not redundant" (i.e., not previously appearing in the sequence) and "0" indicate "redundant" (i.e., previously appearing). Then the actual labeling of the segment in is 1, 1, 1, 1, 0, 1, 1, 1, 1, 1, 0, . . . However, compression routines drop every fifth field and hence the pattern expected is 1, 1, 1, 1, 0, 1, 1, 1, 1, 0, 1, 1, 1, 1, . . .

Determining the states and therefore the labels is performed by estimating so-called "hidden variables" from two sources of information: first, the "observed variables" and second, the prior information about the internal structure of the hidden variables. The observed variables are functionals of the video data forming the video fields, such as luminance and chrominance values carried by F. Each hidden variable $X_n$, $1 \leq n \leq N$, assumes one of 36 possible states as described above; thus, there are $36^N$ possible states for X. Through optimization the most likely sequence of labels is selected from the $36^N$ possible global states based on the video sequence.

The labels are determined by finding the most likely state of the hidden variables consistent with the given data F. Denoting the optimal solution by X*, the labels are the value of X which maximizes the "posterior distribution" where $Y=(y_1, \ldots, y_N)$ represents a scalar representation of the multi dimensional video sequence $(F_n^{(1)}, F_n^{(2)}, F_n^{(3)})$.

$$P(X \mid Y) = \frac{P(X, Y)}{P(Y)}$$

is the conditional probability distribution for the states given a scalar functional representation of the video fields.

In other words, the output of the process is the state $$X^* = X^*(Y) = \arg\max_x (P(X \mid Y))$$

where $Y = \{Y_n(F), n=1, \ldots, N\}$ of scalar functionals of the video fields. For example, a scalar functional for a field might be the distance between the current field and the next field.

Figure 6:
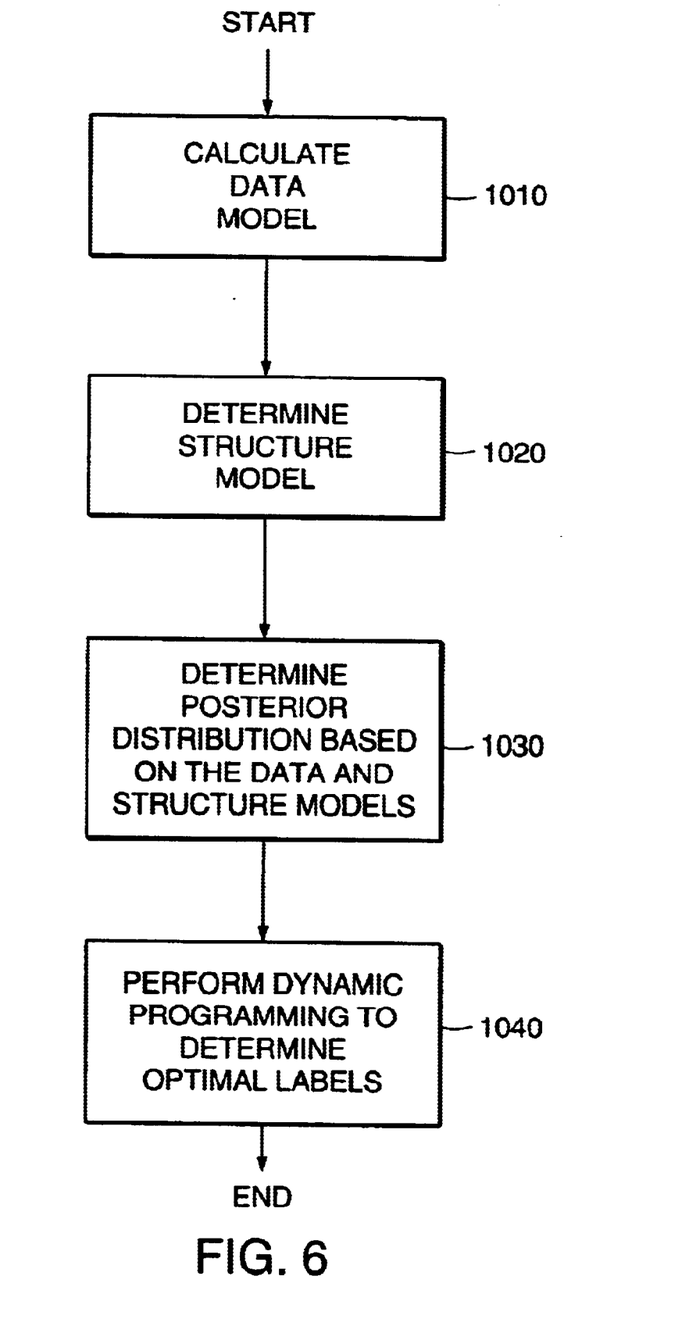
FIG. 6 shows the steps needed to determine the set of labels for a video sequence.

To determine the labels the following method is employed as shown in FIG. 6. First a "data model" is calculated (Step 1010). The data model is one of two components in the joint probability distribution P(X,Y). The "data model" quantifies the interaction between the scalar functional representations of the raw data and the labels. These interactions are expressed in the form of a conditional probability distribution of the functionals $Y_n(F)$, n=1, ..., N, given the true labels. This conditional distribution captures the likelihoods of observing the scalar functional representation of the video fields given the true labels of the individual fields. The data model is of the form $$P(Y_n(F), n=1, \ldots, N \mid X) = \prod_{n=1}^{N} P(Y_n(F) \mid X).$$

The structure model which is the second half of the joint probability distribution is defined (Step 1020). The "structure model" expresses the internal structural behavior of the label process, i.e., the regularities within the label sequence which are expected to be present independently of the particular video sequence. The modeling is stochastic, and hence the structure model (or "prior distribution") is also a probability distribution, P(X). It should be understood, that the structure model and the data model may be calculated in any order or simultaneously.

The posterior distribution $$P(X \mid Y) = \frac{P(X, Y)}{P(Y)}$$

is then computed for optimization (step 1030). First, the data model and the structure model are combined to form the joint probability distribution $P(X,Y)=P(Y|X)P(X)$. The joint distribution has a Markov structure whose underlying graph reflects the natural interactions within each component X and Y separately, as well as between X and Y. For example, pairwise interactions in Y might arise due to common fields appearing in the definition of $Y_i$ and $Y_j$ and interactions between $X_n$ and $Y_n$ are designed to reflect the dependence of the distribution of $Y_n$ on the label of the fields in the vicinity of $F_n$.

The posterior distribution of the Markov model is then expressed as:

$$P(X \mid Y) = \frac{P(Y \mid X)P(X)}{P(Y)}$$

where $$P(Y) = \sum_x P(Y \mid X)P(X)$$

Taking logarithms, and noting that P(Y) does not depend on X and that the logarithm is an increasing function, we arrive at a rearranged posterior distribution which may be used to calculate the optimized labels.

$$X^* = X^*(Y)$$
$$= \arg\max_x [\log P(Y \mid X) + \log P(X)]$$

Finally, dynamic programming is used to compute X* based on the corresponding extreme value problem (Step 1040).

Figure 7:
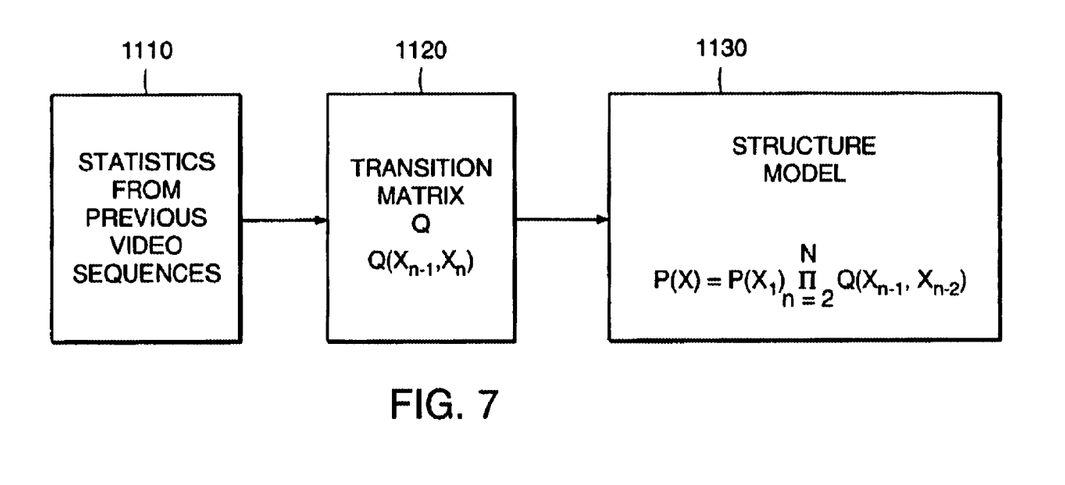
FIG. 7 shows the steps taken in creating the structure model.

FIG. 7 shows the steps taken in creating the structure model. Historic video information is collected and stored in a memory location 1110. This historic video information is estimated from large samples of video data by collecting statistics on the frequency of occurrence of the various one-step transitions A→a, a→$B_1$, a→D', etc. Such information includes location of edit points as indicated by the apostrophes and the origin of the video sequences as indicated by the letters. This compilation of data is converted into a matrix known as a transition matrix or Q matrix for each of the various one step transitions 1120. For example, in a system having 36 possible states as shown in FIG. 4 and 5, the transition matrix has $36^2$ possible transitions. It should be understood to those of ordinary skill in the art that the Q matrix is constructed for mathematical simplification and the structure model may be expressed simply as P(X).

In order to illustrate the typical behavior of video data, we consider several examples of the rows of Q, that is, of probability vectors Q(x, y), y∈S, for selected values of x∈S. For example, if x=A, the normal, expected transition is A→a and most of the mass of the vector Q(A, y), y∈S, resides in the term Q(A, a). The remaining mass (roughly 0.05) is distributed about equally among the fields with parity opposite to A and immediately following a cut, namely the six states y∈{a', b', c', $d'_1$, $d'_2$, u'} Similarly, when x=a, most of the mass of the corresponding row resides in Q(a, $B_1$) because the expected pattern is AaBbBcCdDd. Virtually all the rest of the mass is distributed among the states y∈{A', $B'_1$, $B'_2$, C', D', V' evenly}.

In yet another example, suppose the state x of the field $F_{n-1}$ indicates that $F_{n-1}$ is the first field after a cut, for example x=A'. The most common scenario is A'→a". That is, the field at time n has label a", indicating that it occurs two steps after a cut. However, it is possible, though rare, that another cut occurs immediately, in which case there might be a transition from x=A' to one of the states y∈{a', b', c', $d_1'$, $d_2'$, u'} just as in the first example. It should be understood that many of the possible transitions are extremely rare (or in fact impossible) and hence the Q matrix has many zero values.

From the transition matrix, the structure model can be created 1130. The structure model takes the form of a first-order, homogeneous Markov chain which can be represented as follows:

$$P(X) = P(X_1) \prod_{n=2}^{N} P(X_n \mid X_{n-1})$$

-continued $$P(X) = P(X_1) \prod_{n=2}^{N} Q(X_n, X_{n-1})$$

In order to simplify the computations, most of the entries of the Q matrix are set to zero. Again, the non-zero values are estimated from video material using standard parameter estimation techniques such as maximum likelihood although other estimation techniques may be used.

Figure 8:
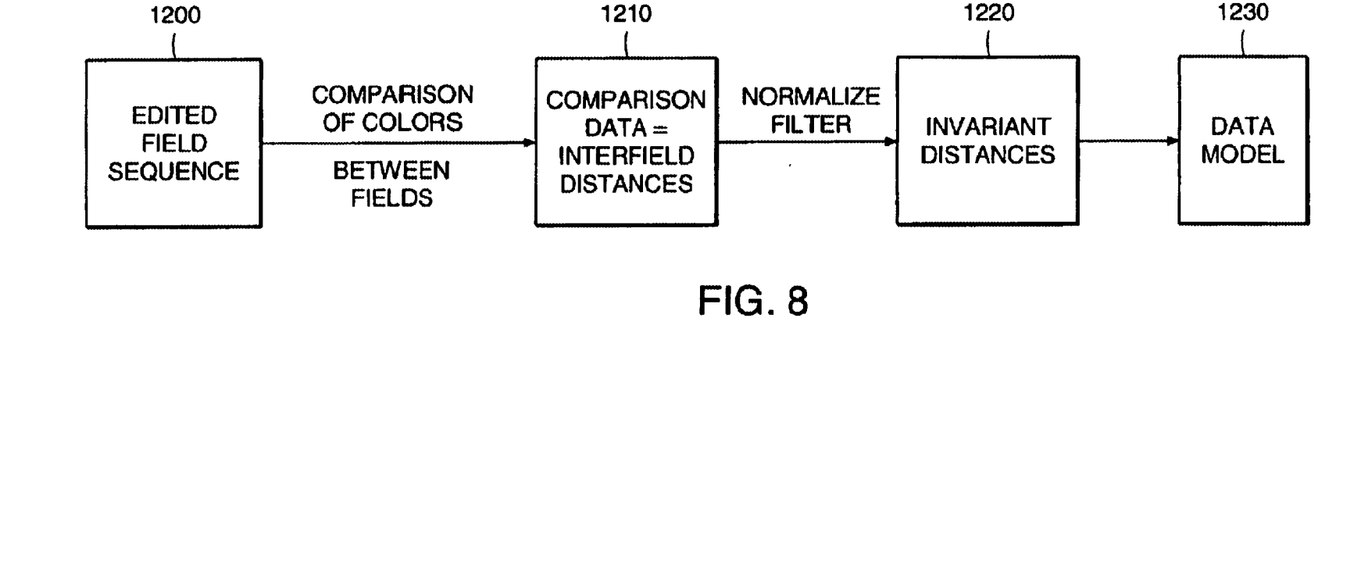
FIG. 8 shows the steps taken in constructing the data model.

FIG. 8 shows the steps taken in constructing the data model. From the edited field sequence the functionals are compared (step 1210). In the case of a video data sequence in which each field is composed of three arrays of data, one each for each R,G, B or Y,U,V a distance is determined between fields. Denote the j'th pixel of $F_n^{(I)}$, I=1, 2, 3, by $F^{(I)}_{n,j}$, j=1, . . . , J. Thus, for example, J=243×720 when the resolution of full digital video frames is 486×720. The distance is determined as the functional:

$$S_n = S_n(F) = \frac{1}{3J} \sum_{I=1,2,3} \sum_{j=1,\ldots,J} \frac{|F^{(I)}_{n,j} - F^{(I)}_{n-2,j}|}{F^{(I)}_{n,j} + F^{(I)}_{n-2,j}}, \quad n = 3, \ldots, N.$$

The scalar $S_n$ is a measure of the discrepancy between fields $F_n$ and $F_{n-2}$ and assumes values in the interval [0, 1]. Measuring the distance between fields two units apart restricts comparisons to fields of the same parity odd to odd or even to even. The scalar functional of the equation for $S_n$ is the sum of the absolute difference of n and n−2. It should be understood that other scalar values may be used to represent a field. For example, the squared difference or a weighted difference. It should be understood that $S_n$ only need be a representation of the video data in the described embodiment. $S_n$ can be any reasonable measure of the "distance" between $F_n$ and $F_{n-1}$.

In order to stabilize and normalize the functionals $S_n$, two additional operations are performed. First, the intensity differences are filtered (step 1220) in that $|F^{(I)}_{n,j} - F^{(I)}_{n-2,j}|$ is set to zero if the difference is less than predetermined a threshold; this makes the results robust to noise and other small, fluctuations. Although the step of filtering is useful it is not required for the method. Second, the functionals are adjusted for normal statistical fluctuations and normalized (step 1225) by replacing each $S_n$ by $$Y_n = \frac{S_n}{M_n + S_n}$$

where $M_n$ is the median value of the five numbers $\{S_{n-2}, S_{n-1}, S_n, S_{n+1}, S_{n+2}\}$. It should be understood that $Y_n$ could be derived in different manners. For example, $M_n$ could be the value of the twenty-fifth quantile or the seventy-fifth quantile rather than the median (fiftieth quantile) which would provide $Y_n$ with a different weighting. $Y_n$ need only be a representation of the video data. For instance, $S_n$ could be used for $Y_n$. It should be understood that $Y_n$ can be a functional representation of a video field or a vector representation in alternative embodiments. In alternative embodiments, both $S_n$ and $Y_n$ may not be necessary as the data model may be represented as the conditional probability of the original video field sequence itself given the set of labels. That is the video field data is not represented by a scalar value, but is instead represented by the actual video field data or a vector representation of the video field data or a functional representation of the video field data or another representation.

As stated above, the data model stipulates the conditional probability distribution of the normalized functionals $Y=(Y_3, \ldots Y_N)$ given the label values X. In the model, the individual variables $Y_3, \ldots, Y_N$ are assumed to be conditionally independent. Therefore, only the univariate conditional distributions $P(Y_n=y|X)$, n=3, . . . , N, need be specified. Another assumption is that the distribution of $Y_n$ given X depends only on $X_n$, the label for field $F_n$. This assumption is reasonable due to the relatively large amount of information carried by the state space S. There are three mutually exclusive and exhaustive cases for the data model $P(Y_n=y|X_n)$ depending on the nature of the state $X_n$. In each case the distribution of $Y_n$ conditional on $X_n$ is assumed to be a Gaussian distribution with a case-dependent mean and variance. It should be understood by those of ordinary skill in the art that other distributions may be used in place of a Gaussian distribution based upon the type and nature of the input data which the probability distribution is representing.

The three cases mentioned above are repeated fields, different frames, and intervening cuts. For repeated fields, if for example $X_n=B_2$, then the two labels preceding $X_n$ are expected to be $X_{n-2}=B_1$ and $X_{n-1}=b$. Although it is possible that the video has been cut between n−2 and n, the normalized distance $Y_n$ between the vector fields $F_{n-2}$ and $F_n$ is usually relatively small. The same is true when $X_n =d_2$, in which case the most likely scenario is $(X_{n-2}, X_{n-1}, X_n)=(d_1, D, d_2)$. In the second case, if there are different frames, $X_n \in \{A, a, B_1, b, C, c, D, d_1, V, v\}$, and no cut intervenes between n−2 and n, then fields $F_{n-2}$ and $F_n$ come from different frames and their distance apart, $Y_n$ is expected to be larger than for repeated fields. For an intervening cut, $X_n$ denotes a label indicating a field either immediately following a cut (A', a ', etc.) or two fields after a cut (A", a", etc.), then we expect a much larger average distance between $F_{n-2}$ and $F_n$.

Let a(x) be an indicator of the case: let a(x)=1 if $x \in \{B_2, d_2\}$ for repeated fields, let a(x)=3 for different frames and let a(x)=2 for an intervening cut. Assuming a Gaussian probability distribution, the conditional density of $Y_n$ given $X_n=x$ is:

$$P(Y_n = y \mid X_n = x) = g(y \mid a(x))$$
$$= \frac{1}{\sqrt{2\pi}\,\sigma_{a(x)}} \exp - \frac{(y - \mu_{a(x)})^2}{2\sigma^2_{a(x)}}$$

where $\mu_1, \mu_2, \mu_3$ are the mean values of $Y_n$ in the three cases and $\sigma_1, \sigma_2, \sigma_3$ are the corresponding standard deviations. The mean values and the standard deviation values for each case are each determined based upon historic video sequence data. Both the standard deviation and the mean are determined by maximum likelihood estimation based on samples of $Y_n$ values. It should be understood by one skilled in the art that other estimation techniques may be used.

The final data model is then the joint conditional density $$P(Y = y \mid X = x) = \prod_{n=3}^{N} g(y_n \mid a(x_n))$$

where $y=(y_1, \ldots, y_N)$ and $x=(x_1, \ldots, x_N)$.

Figure 9:
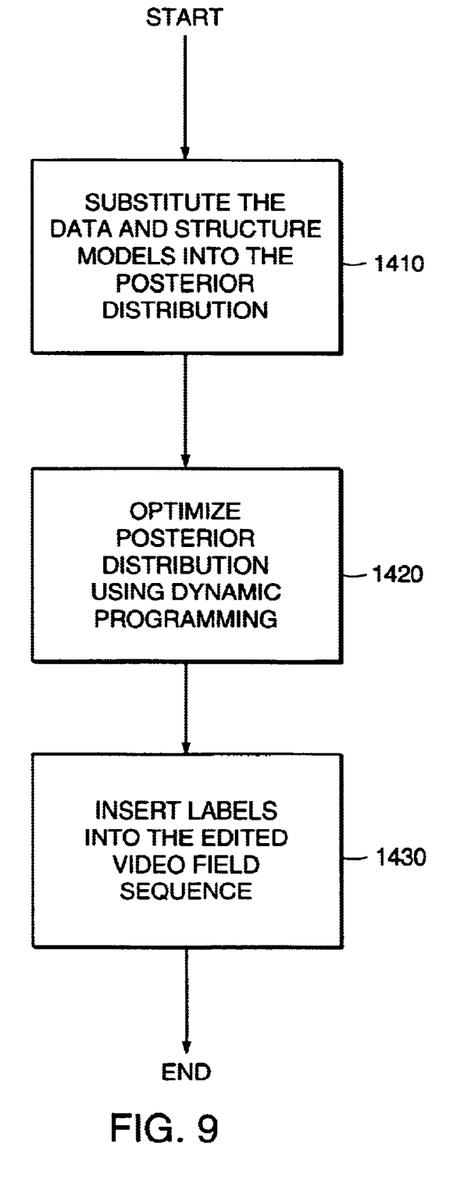
FIG. 9 shows the steps for determining the labels from the posterior distribution.

FIG. 9 shows the steps for determining the labels from the posterior distribution. The data model and the structure model which forms the term P(X,Y) are substituted into the posterior distribution P(X|Y)=P(X,Y)|P(Y) (Step 1410). The labels are then calculated from the posterior distribution. The posterior distribution is optimized to compute the state in which the probability of labels occurring is maximized ($X^*$=arg max [log P(Y|X)+log P(X)]) (Step 1420). In view of the data model, the first term in this optimization equation is $$\log P(Y = y \mid X = x) = \sum_{n=3}^{N} \log g(y_n \mid a(x_n))$$

where $g(y_n|a(x_n))$ is the conditional density with mean $\mu_a(x_n)$ and standard deviation $\sigma_a(x_n)$. Given the preferred structure model, the second term is $$\log P(X = x) = \log P(X_1 = x_1) + \sum_{n=2}^{N} \log Q(x_{n-1}, x_n).$$

As a result, the optimal labeling are represented as $$X^* = \arg\max_{x} \Phi(x; y)$$
$$= \arg\max_{x} \sum_{n=2}^{N} \Phi_n(x_{n-1}, x_n; y_n)$$

where $$\Phi_2(x_1, x_2) = \log P(X_1 = x_1) + \log Q(x_1, x_2)$$

and $$\Phi_n(x_{n-1}, x_n; y_n) = \log Q(x_{n-1}, x_n) + \log g(y_n|a(x_n)), n=3, \ldots, N$$

Maximizing $\Phi$ (x;y) is then performed using dynamic programming. Once the labels are determined the labels are inserted into the video sequence (Step 1430).

Dynamic programming (or "backwards induction") is known to one of ordinary skill in the art and is used for finding the maximum values of a real-valued function $\Phi$ (x). Dynamic programming is computationally feasible, because $\Phi$ (x) can be represented as a sum of functions which are each "locally composed" with respect to the structure of the domain of $\Phi$ and because, whereas N is very large, |S| is relatively small. The cost of finding the maximizing value can be shown to be on the order of $N \times |S|^2$ and therefore, the cost grows linearly with N. Dynamic programming can be implemented in computer code and executed on a computer or processor.

Dynamic programming takes advantage of the fact that there is no direct "interaction" between any two labels which are not adjacent in the ordering among the fields. In the preferred embodiment in which there are 36 possible states, states x=A,B,C,D all have the same probability and it is assumed that film originating material is more likely than video originating material.

It should be understood by one of ordinary skill in the art that there are other embodiments for labeling video fields based on estimation in the context of Markov processes on graphs and dynamic programming. In an alternative context in which the state space is smaller and the number of possible labels is fewer, the data model takes a different form. In particular, in one alternate implementation, the data model has the general form:

$$P(Y/X) = \prod_{n=1}^{N} P(Y_n \mid X)$$
$$= \prod_{n=1}^{N} P(Y_n \mid X_{n-2}, X_{n-1}, X_n)$$

As a result of the longer range interactions, the posterior distribution P(X|Y) is no longer first-order Markov. Instead, there are now groups of size three in the posterior distribution and the optimal labeling is characterized as the solution of an optimization problem of the form:

$$X^* = \arg\max_{X} \Phi(x) \quad \text{where} \quad \Phi(x)$$

can be expressed as $$\sum_{n=3}^{N} \Phi_n(X_{n-2}, X_{n-1}, X_n).$$

or $$\Phi(x) = \sum_{n=3}^{N} \Phi_n(\chi_{n-2}, \chi_{n-1}, \chi_n).$$

The method for dynamic programming is altered for the alternative embodiment. The last variable $\chi_N$ is coupled to both $\chi_{N-2}$ and $\chi_{N-1}$. Therefore, it is necessary to fix both $\chi_{N-2}$ and $\chi_{N-1}$ in computing the optimal state for $\chi_N$. Thus, at each iteration of the dynamic programming, a minimization over one variable is performed for each pair of states.

Figure 10:
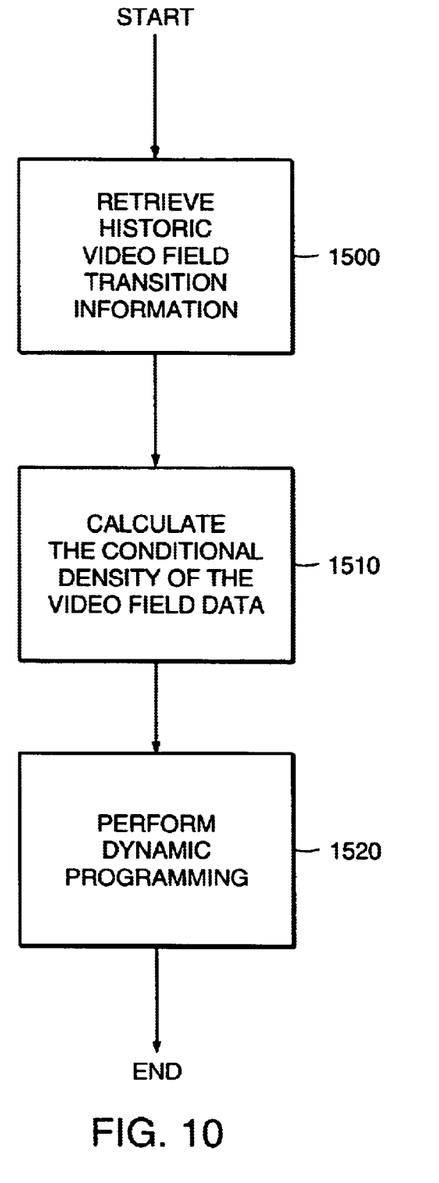
FIG. 10 shows an exemplary method for determining labels for video fields in an edited video sequence.

The disclosed methods can be implemented in a computer program or may be implemented in hardware. When presented as a computer program, the method of FIG. 10 is performed. The equation for dynamic programming requires only the historic data in the form of the transition matrix Q and the conditional density which is calculated based upon the actual video data to be labeled and the historic video data. In the first step, historic video data is retrieved from memory. In the preferred embodiment, the historic video data would have the form of a transition matrix $Q(x_{i-1}, x_i)$ for all transition pairs of video fields $x_{i-1}, x_i$ (step 1500). The historic data is loaded into a computer processor and then the conditional density $g(y_i|a(x_i))$ is calculated for all possible values of a(x) (step 1510). A functional representation of the actual video data is calculated ($y_i$) and for all possible label sequences, a(x) is determined which is then used to determine which mean and standard deviation for calculating $g(y_i|a(x_i))$. All of the means and standard deviations are precalculated for each $a(x_i)$. It should be understood by those of ordinary skill in the art that steps is calculated based on the current edited video field sequence, dynamic programming is performed to determine the sequence of labels (step 1520). After the labels have been determined for the video fields, the labels may be inserted into the video field data or attached as a header to each field. In an alternative embodiment, the labels are stored as a list and sent as a separable file from the video field data for further processing, such as, cadence editing.

It should be understood by those of ordinary skill in the art that labels for each field may be individually determined rather than determining the sequence of labels. This may be accomplished by changing the Q matrix of the structure mode. In such an embodiment, the Q matrix would only be a function of one variable and therefore the structure model would be an independent model. If the Q matrix is a function of one variable all of the rows of the Q matrix are identical. Changing the Q matrix to an independent model is a special case and simplified version of the method, apparatus, and computer code taught above.

In an alternative embodiment, the disclosed method for video field labeling may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Preferred embodiments of the present invention have been described. While the invention is described in detail herein, it is to be clearly understood that the same is by way of illustration and example and is not to be taken by way of limitation. Indeed, numerous variations and modifications will be apparent to those skilled in the art. All such variations and modifications are intended to be within the scope of the present invention as defined in the appended claims.

We claim:

1. A method of delineating at least one label for an edited video field sequence, wherein the video field sequence is composed of a plurality of video fields from different originating sources, each label providing state information about a video field in the video field sequence and at least indicating a field's proximity to an edit point, the method comprising:

receiving the edited video field sequence; and
   determining the at least one label based on optimizing a conditional probability distribution function;
   wherein the conditional probability distribution function is the probability of the state associated with the label occurring given the edited video field sequence.

2. A method according to claim 1, wherein the step of determining is accomplished using dynamic programming.

3. A method according to claim 1, wherein optimizing orders the possible states for the at least one label according to probability of occurrence.

4. A method according to claim 1, wherein the at least one label is determined using the optimal solution.

5. A method according to claim 1, wherein the at least one label is determined using a substantially optimal solution.

6. A method according to claim 1, wherein a label is determined for each video field.

7. A method according to claim 6, wherein optimizing orders the possible states for the label sequence according to probability of occurrence.

8. A method according to claim 1, wherein the labels indicate the originating source of the video field.

9. A method according to claim 1, wherein the labels indicate whether the field is a repeated field.

10. A method according to claim 1, wherein the edited video field sequence is interlaced.

11. A method according to claim 10, wherein the labels indicate whether a field is an odd or an even fields.

12. A method according to claim 1, further comprising:
    inserting labels at the edit points into the edited video field sequence.

13. A method according to claim 1, wherein the conditional probability function can be defined by at least two components.

14. A method according to claim 13, wherein the first component is the conditional density and wherein the second component is the probability of video field transitions.

15. A method according to claim 14, wherein the conditional density is determined for each set of states for the possible labels.

16. A method according to claim 15, wherein the conditional density is determined based in part on statistical video data.

17. A method according to claim 16, wherein the statistical video data includes standard deviations and means for possible transitions.

18. A method according to claim 17, wherein the possible transition is a repeated field.

19. A method according to claim 17, wherein the possible transition is a different frame.

20. A method according to claim 17, wherein the possible transition is an intervening cut.

21. A method according to claim 1, wherein the conditional probability distribution function is partially based on a compilation of historic data regarding transitions between fields.

22. A method for determining labels for an edited digital video sequence having video fields from different originating formats, each label representative of the state of a video field, each state providing information at least as to the originating format of the video field and to edit points in the digital video sequence, the method comprising:

estimating a label sequence which is consistent with the digital video sequence based upon a conditional probability distribution for the label sequence given a representation of the video fields.

23. A computer program product on a computer readable medium for determining labels for video fields in a video field sequence, the computer program product having computer code, the computer code comprising:

computer code for retrieving historic video field transition data from an associated memory location;
    computer code for determining conditional densities for possible label sequences; and
    computer code for determining labels by dynamic programming using the historic video field transition data and the conditional densities.

24. The computer program product according to claim 23, wherein the historic video field transition data contains information regarding one step transitions between video fields.

25. The computer program product according to claim 23, wherein the conditional densities are based upon a probability distribution function.

26. The computer program product according to claim 25, wherein the probability distribution function is a Gaussian probability distribution function.

27. A method for determining labels for video fields according to claim 15, wherein the conditional density requires:

representing the digital video fields as scalar functionals.

28. A method for determining labels for video fields according to claim 27, wherein the scalar functionals are a representation of distance between consecutive video fields.

29. A computer program product for use on a computer system for determining labels for video fields for recovering temporal cadence of an edited digital video sequence composed of video data, the computer program product comprising a computer usable medium having computer readable program code thereon, the computer readable program code including:

computer code for optimizing a conditional probability distribution based on the video data of the video fields determining a sequence of labels for associating with the video fields; and computer code for labeling the video fields with indicia of state which includes proximity within the video sequence to an edit point based on the conditional probability distribution.

30. A computer program product according to claim 29, further comprising:

computer code for parsing the video data into video fields.

31. A computer program product according to claim 29, computer code for optimizing further comprises:

computer code for measuring the distance between video fields.

32. A computer program product according to claim 31, wherein the computer code for optimizing further comprises:

computer code for determining conditional densities based upon the asured distance between video fields.

33. A computer program product according to claim 32, wherein the computer code for optimizing further comprises:

computer code for performing dynamic programming.

34. A computer program product according to claim 33, wherein the computer code for performing dynamic programming uses the conditional densities and historic field transition data to determine the labels.

35. A system for determining labels for fields in an edited video sequence, the system comprising:

an input for receiving historic field transition information and for receiving video field of the edited video sequence;

a probability module for determining conditional density distribution based in part upon the video field data; and an optimizer receiving the historic video information from the input and the conditional density distribution and performing an optimization routine to determine the labels.

36. The system according to claim 35, wherein the conditional probability represents the probability of a label occurring given a representation of the video field sequence.

37. The system according to claim 35, wherein the optimizer module performs dynamic programming.

38. A labeled video field which is part of an edited video field sequence, the labeled video field comprising:

a label portion having indicia as to the source of the video field, and indicia as to proximity to an edit point in the edited video field sequence; and a video portion having data representative of color.

39. A labeled video field according to claim 38, wherein the labeled video field is embodied on a carrier wave.

40. A labeled video field according to claim 38, wherein the labeled video field is embodied in a memory location.

41. A labeled video field according to claim 38, wherein the label portion of the labeled video field contains indicia as to whether the field is a repeated field in the video field sequence.

42. A labeled video field according to claim 38, wherein the indicia as to source of the labeled video field indicates whether the video field is film originating or video originating.

43. A labeled video field according to claim 42, wherein if the label portion of the labeled video field indicates that the field is film originating the label portion further indicates the position of the video field within a 3:2 pulldown sequence.

* * * * *